May 20, 1969     K. A. HIRSCHBERG ET AL     3,445,807

AIRBORNE ACOUSTIC GROUND FIRE DETECTOR

Filed Nov. 16, 1967

INVENTORS

Kenneth A. Hirschberg
John E. Boren

By: Harry M. Saragovitz,
Edward J. Kelly, Herbert Berl
& R. P. Gibson ATTORNEYS.

United States Patent Office 3,445,807
Patented May 20, 1969

1

3,445,807
AIRBORNE ACOUSTIC GROUND FIRE DETECTOR
Kenneth A. Hirschberg, Saratoga, and John E. Boren, Monterey, Calif., assignors, by mesne assignments, to the United States of America as represented by the Secretary of the Army
Filed Nov. 16, 1967, Ser. No. 683,608
Int. Cl. H04b 11/00; G01s 3/80
U.S. Cl. 340—15     2 Claims

ABSTRACT OF THE DISCLOSURE

Airborne apparatus for detecting and indicating both visually and aurally the passage of acoustic energy associated with supersonic projectile consisting of a microphone mounted on an external surface of the aircraft for detection and conversion of the acoustic energy to electrical signals which are amplified and applied to a Schmitt trigger which in turn triggers a one-shot multivibrator having two outputs. One of the outputs functions a relay which connects an electronic counter, counting once for each projectile within range of the apparatus, and a counting lamp, flashing once for each said projectile, across a power supply. The other of the outputs is coupled to another one-shot multivibrator having its output connected to a relay which responds thereto to connect an audio frequency generator to the aircraft's intercom system and to connect a warning lamp across the power supply thereby providing both aural and visual indications.

---

Fixed-wing and rotary-wing aircraft or airboats in counterinsurgency environment are frequently subjected to hostile ground fire most of which is from small arms, semiautomatic and automatic weapons and machine guns which are located in well concealed positions. Aural and visual methods of detecting hostile fire, for example, by helicopter crews have not been reliable because of high noise level in the cabin area and excellent camouflage and concealment techniques employed by the insurgents.

The problem in the instant matter is that of signal to noise ratio, that is, the detection of one particular band or bands of frequencies in the presence of other energy. The signal is the sound of the shock wave produced by a supersonic projectile. This shock wave has quite a broad band with components ranging from several hundred cycles per second to in excess of 100,000 cycles per second. The spectrum of energy actually detected depends on the caliber and trajectory to detector distance, and to a lesser degree on the velocity of the projectile. As a practical matter, the shock wave energy associated with small arms with miss distances of a few feet to 200 feet may be considered to lie mostly within the band of 2000 to 20,000 cycles per second. The noise, when considering helicopters, is due to wind and engines and is predominantly below 3000 cycles per second depending upon airspeed. The rotor prop noise is usually also below 3000 cycles per second.

It is accordingly an object of the invention to provide a new and improved airborne acoustic ground fire detector.

Another object of the invention is an airborne electronic means for detecting and indicating both visually and aurally the passage of acoustic energy associated with supersonic projectiles.

Another object of the invention is electronic means which detects the passage of supersonic projectiles by "listening" for the shock wave of the passing projectiles while excluding normal ambient noise.

A further object of the invention is an airborne electronic means for detecting and indicating visually and aurally the passage of acoustic energy associated with supersonic projectiles including means for indicating and recording the number of supersonic projectiles fired in the vicinity of the aircraft.

Figure 1:
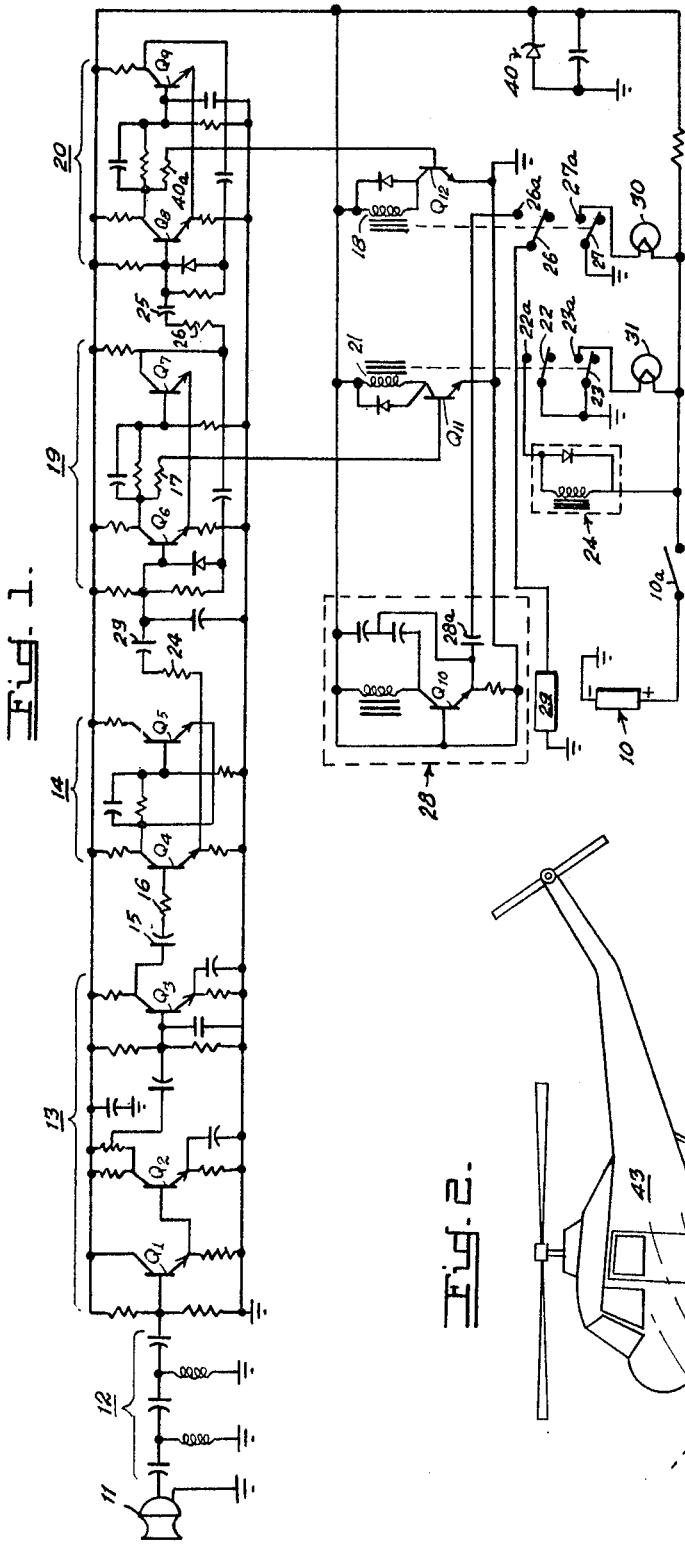
Figure 2:
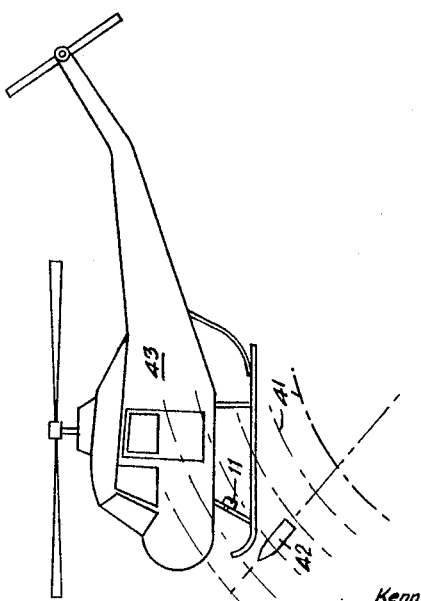

A fuller understanding of the invention may be had by referring to the following description and claims taken in conjunction with the accompanying drawings in which:

FIGURE 1 is a schematic of a preferred form of the airborne acoustic ground fire detector of the invention; and FIGURE 2 is an illustration showing the acoustic pickup mounted externally on the skid gear cross tube of a helicopter.

Referring now to the drawings, FIGURE 1, there is shown D.C. power source 10 of the aircraft, provided with voltage regulating means 40, which supplies a D.C. voltage to the airborne acoustic ground fire detector. Switch 10a is the means for connecting or disconnecting the ground fire detector to power source 10. An acoustic pickup comprising microphone 11 is mounted externally on the aircraft, for example, on the cross tube of the skid gear of helicopter 43, FIGURE 2, for detecting the shock waves 41 of supersonic projectiles 42 passing in the vicinity of aircraft 43. Microphone 11 which in one instance has a frequency response of 20 to 10,000 cycles per second converts the shock waves into electrical signals and is conventionally coupled to the input of high-pass L–C filter 12 whereby said signals and other signals due to ambient noise within the microphone's range are applied to said filter. High-pass L–C filter 12 is designed to eliminate signals below 4,500 cycles per second and above 10,000 cycles per second. This band 4,500–10,000 cycles contains a great deal of the shock wave energy and is above the majority of helicopter produced noises. The filtered signal at the output of high-pass filter 12 is coupled to the base of the emitter-follower $Q_1$ of amplifier 13 which comprises emitter-follower $Q_1$ and two stage common-emitter amplifier, $Q_2$ and $Q_3$. A Schmitt trigger 14, transistors $Q_4$ and $Q_5$, is triggered by means of the amplified filtered signal which is applied thereto through means of series connected capacitor 15 and resistor 16 which couples the base of transistor $Q_4$ to the collector of transistor $Q_3$. The output of Schmitt trigger 14 is applied to and initiates a 20 millisecond one-shot multivibrator 19, transistors $Q_6$ and $Q_7$, which drives a relay driver transistor $Q_{11}$ into conduction and also triggers a ½ second one-shot multivibrator 20, transistors $Q_8$ and $Q_9$. The base of transistor $Q_8$ is coupled to the collector of $Q_7$ through series connected capacitor 25 and resistor 26. The base of relay driver transistor $Q_{11}$ is coupled to the collector of transistor $Q_6$ of multivibrator 19 through resistor 17 whereby the signal at collector of transistor $Q_6$ drives transistor $Q_{11}$ into saturation actuating relay 21 which is in series connection with the collector of transistor $Q_{11}$ and the positive side of D.C. power source 10. The emitter of transistor $Q_{11}$ is returned to the negative or ground side of D.C. power source 10. Relay 21 is provided with double pole, double throw switching elements. The poles 22 and 23 of the switching elements are connected to ground and normally in the off position as shown in the schematic. However, when relay driver transistor $Q_{11}$ is driven into conduction by multivibrator 19 relay 21 is activated and poles 22 and 23 thereof close upon contacts 22a and 23a whereupon electronic counter 24 and countlamp 31, respectively, are placed across power supply 10.

Relay driver transistor $Q_{12}$, the base of which is coupled to the collector of transistor $Q_8$ through resistor 40a, has its collector connected to the positive side of D.C. power source 10 through relay 18 and its emitter returned to the negative or ground side thereof. Relay 18 is also provided with double pole, double throw switching elements. The poles 26 and 27 of relay 18 normally are in the off position as shown in the schematic. An audio frequency oscillator 28 utilizing a transistor $Q_{10}$ is connected across the D.C. power source 10. The audio frequency signal generated by oscillator 28 is taken off at the emitter of transistor $Q_{10}$ which is capacitively coupled to contact 26a of relay 18 by means of capacitor 28a.

Pole 26 is connected to the aircraft's intercom system 29 whereby a warning tone is provided for the pilot of said craft when relay 18 is activated. When relay driver transistor $Q_{12}$ is driven into conduction by multivibrator 20 pole 26 switches to contact 26a whereby the audio tone signal of oscillator 28 is coupled to the aircraft's intercom system producing a warning tone for the pilot and grounded pole 27 closes upon contact 27a to place warning light 30 across D.C. power source 10 thereby providing visual warning means.

In summary, the acoustic pickup 11 detects shock waves of supersonic projectiles passing near the aircraft as well as the ambient noises and presents them as electrical signals of corresponding frequencies to the input of L–C filter 12 which passes only those signals between predetermined limits, for example, 20 to 10,000 cycles per second, to the exclusion of signals resulting from ambient noises. The filtered signal is amplified by amplifier 13 which produces an amplified filtered signal used to trigger Schmitt trigger 14 which initiates 20 millisecond one-shot multivibrator 19. Multivibrator 19 activates relay driver $Q_{11}$ causing relay 21 to close and also triggers ½ second one-shot multivibrator 20 which activates relay driver $Q_{12}$ causing relay 18 to close. Relay 21 remains closed for approximately 20 milliseconds during which count lamp 31 flashes once and electronic counter 24 counts once for each shock wave produced by supersonic projectiles passing within the range of acoustic pickup 11. At the same time relay 18 remains closed for ½ second causing warning lamp 30 to light for ½ second and the audio frequency oscillator 28 to be coupled to the aircraft's intercom system 29 to produce a warning tone or signal therein for ½ second. The warning lamp and oscillator remain on for ½ second and then go off for 1/10 second. The cycle is repeated until firing stops.

Although a specific embodiment of the invention has been illustrated and described, it will be understood that this is but illustrative and that various modifications may be made therein without departing from the spirit of the invention and the scope of the appended claims.

We claim:

1. Apparatus carried by an aircraft for detecting the energy of shock waves of supersonic projectiles fired at the aircraft while excluding ambient noises and including means for counting and recording the number of said projectiles and providing visual and aural indication thereof comprising in combination, a D.C. power supply in said aircraft coupled to said apparatus, an intercom system in said aircraft, acoustic pickup means affixed to an external surface member of the aircraft for detecting and converting the energy of said shock waves into electrical signals of corresponding frequencies, electrical filter means coupled to said acoustic pickup means providing passage for said electrical signals to the exclusion of electrical signals generated due to ambient noises thereby producing filtered electrical signals, amplifier means coupled to said electrical filter means providing amplified filtered electrical signals, a transistor Schmitt trigger coupled to and activated by said amplified filtered electrical signals, a first gate generating means responsive to said Schmitt trigger comprising a transistor 20 millisecond one-shot multivibrator having an input coupled to said Schmitt trigger and a first and second output, a first relay, a counter lamp operative by action of said first relay to be connected across said D.C. power supply whereby said counter lamp flashes once for each said filtered electrical signals, an electronic counter operative by action of said first relay to be connected across said D.C. power supply whereby said electronic counter counts once for each said filtered electrical signals, a single-transistor switch coupling said first relay and said first output whereby said first relay is activated by said first output, and aircraft crew warning means comprising a second gate generating means responsive to said second output, a second relay, second relay driver means coupling said second relay to the output of said second gate generating means and responsive thereto to activate said second relay, audio frequency generating means, and a warning lamp, said second relay operative to couple said audio frequency generating means to said intercom system whereby a warning signal is produced therein and to connect said warning lamp across said D.C. power supply thereby providing visual warning when said second relay is activated.

2. Apparatus carried by an aircraft for detecting the energy of shock waves of supersonic projectiles fired at the aircraft while excluding ambient noises and including means for counting and recording the number of said projectiles and providing visual and aural indication thereof comprising in combination, a D.C. power supply in said aircraft coupled to said apparatus, an intercom system in said aircraft, acoustic pickup means affixed to an external surface member of the aircraft for detecting and converting the energy of said shock waves into electrical signals of corresponding frequencies, electrical filter means coupled to said acoustic pickup means providing passage for said electrical signals to the exclusion of electrical signals generated due to ambient noises thereby producing filtered electrical signals, amplifier means coupled to said electrical filter means providing amplified filtered electrical signals, a transistor Schmitt trigger coupled to and activated by said amplified filtered electrical signals, a first gate generating means responsive to said Schmitt trigger comprising a 20 millisecond one-shot multivibrator having an input coupled to said Schmitt trigger and a first and second output, a first relay, a counter lamp operative by action of said first relay to be connected across said D.C. power supply whereby said counter lamp flashes once for each said filtered electrical signals, an electronic counter operative by action of said first relay to be connected across said D.C. power supply whereby said electronic counter counts once for each said filtered electrical signal, a first single-transistor switch coupling said first relay and said first output whereby said first relay is activated by said first output, and aircraft crew warning means comprising a transistor ½ second one-shot multivibrator coupled to and operative in response to said second output, a second relay, a second single-transistor switch coupling said second relay to the output of said transistor ½ second one-shot multivibrator and responsive thereto to activate said second relay, audio frequency generating means, and a warning lamp, said second relay operative to couple the output signal of said audio frequency generating means to said intercom system whereby a warning signal is produced therein and to connect said warning lamp across said D.C. power supply thereby providing visual warning when said second relay is activated.

References Cited

UNITED STATES PATENTS 3,268,856  8/1966  Wallen _____ 340—115

FOREIGN PATENTS 672,782  5/1952  Great Britain.

RICHARD A. FARLEY, *Primary Examiner.*

US. Cl. RX.

340—16